US007469527B2

(12) United States Patent
Negre et al.

(10) Patent No.: US 7,469,527 B2
(45) Date of Patent: Dec. 30, 2008

(54) ENGINE WITH AN ACTIVE MONO-ENERGY AND/OR BI-ENERGY CHAMBER WITH COMPRESSED AIR AND/OR ADDITIONAL ENERGY AND THERMODYNAMIC CYCLE THEREOF

(75) Inventors: Guy Negre, Carros Cedex (FR); Cyril Negre, Carros Cedex (FR)

(73) Assignee: MDI - Motor Development International S.A., Luxembourg (LU)

( * ) Notice: Subject to any disclaimer, the term of this patent is extended or adjusted under 35 U.S.C. 154(b) by 0 days.

(21) Appl. No.: 10/579,549

(22) PCT Filed: Nov. 17, 2004

(86) PCT No.: PCT/FR2004/002929

§ 371 (c)(1),
(2), (4) Date: Jan. 17, 2007

(87) PCT Pub. No.: WO2005/049968

PCT Pub. Date: Jun. 2, 2005

(65) Prior Publication Data

US 2007/0101712 A1 May 10, 2007

(30) Foreign Application Priority Data

Nov. 17, 2003 (FR) .................................. 03 13401

(51) Int. Cl.
*F02C 5/00* (2006.01)

(52) U.S. Cl. ...................................................... 60/39.6

(58) Field of Classification Search .................. 60/39.6, 60/517–518
See application file for complete search history.

(56) References Cited

U.S. PATENT DOCUMENTS

| | | | | |
|---|---|---|---|---|
| 4,149,370 | A * | 4/1979 | Ayala Vargas | 60/39.6 |
| 4,444,024 | A * | 4/1984 | McFee | 62/401 |
| 4,696,158 | A * | 9/1987 | DeFrancisco | 60/39.62 |
| 6,305,171 | B1 * | 10/2001 | Negre et al. | 60/653 |
| 6,568,186 | B2 * | 5/2003 | Zaleski | 60/698 |

FOREIGN PATENT DOCUMENTS

| | | | |
|---|---|---|---|
| DE | 195 15 325 | A | 10/1996 |
| FR | 2 769 949 | A | 4/1999 |
| FR | 2 779 480 | A | 12/1999 |
| FR | 2 831 598 | A | 5/2003 |

* cited by examiner

*Primary Examiner*—Hoang M Nguyen
(74) *Attorney, Agent, or Firm*—Young & Thompson

(57) ABSTRACT

An engine uses a top dead center piston stop device. It is fed by compressed air, via a working capacity, which, in the bi-energy version, includes a device for heating the air supplied by additional energy. The active expansion chamber consists of a variable volume or charge piston sliding in a cylinder, coupled to a space above the engine piston via a passage. When stoped at upper dead center, the pressurized air is admitted into the expansion chamber with the smallest volume thereof and, under the effect of thrust, increases the volume thereof by producing work; the expansion chamber is then kept at a maximum volume during expansion of the engine cylinder driving back the engine piston in its downward stroke, providing work of its own. During exhaust, the two pistons travel in an upward stroke and simultaneously reach top dead center in order to resume a new cycle.

21 Claims, 8 Drawing Sheets

ENGINE WITH AN ACTIVE MONO-ENERGY AND/OR BI-ENERGY CHAMBER WITH COMPRESSED AIR AND/OR ADDITIONAL ENERGY AND THERMODYNAMIC CYCLE THEREOF

BACKGROUND OF THE INVENTION

1. Field of the Invention

The invention concerns an engine which runs notably on compressed air or any other gas, and more particularly using a piston travel control device which stops the piston at top dead centre for a period of time together with a device for recovering ambient thermal energy which can operate in mono- or bi-energy mode.

2. Description of the Related Art

The author has registered numerous patents concerning drive systems along with their installations using compressed air for totally clean operation in urban and suburban locations:

WO 96/27737 WO 97/00655
WO 97/48884 WO 98/12062 WO 98/15440
WO 98/32963 WO 99/37885 WO 99/37885

For the implementation of these inventions, he has also described in his patent application WO 99/63206, to which reference should be made, an engine piston travel control device and process which enables the piston to be stopped at top dead centre, a process also described in his patent application WO 99/20881 to which reference should also be made and concerning the operation of these engines with mono-energy or bi-energy and two or three powering modes.

In his patent application WO 99/37885 to which reference should also be made, he proposes a solution which increases the amount of usable and available energy which can be used which uses the fact that, before being introduced into the combustion and/or expansion chamber of the engine, the compressed air coming from the storage reservoir either directly or via the heat exchanger(s) of the ambient thermal energy recovery device is channelled into a thermal heater where, by increasing its temperature, the pressure and/or volume is further increased before introduction into the combustion and/or expansion chamber of the engine thus further considerably increasing the performance which can be obtained by the said engine.

In spite of the use of fossil fuel, the use of a thermal heater has the advantage of enabling clean continuous combustion to be used which can be catalyzed or depolluted by any existing means in order to obtain minimal polluting emissions.

The author has registered a patent no. WO 03/036088 A1, to which reference should be made, concerning a motor compressor-motor generator unit with supplementary compressed air injection operating in mono- or multi-energy.

In these types of engine operating with compressed air and comprising a storage reservoir of compressed air, the compressed air held at high pressure in the reservoir but whose pressure reduces as the reservoir is emptied, must be lowered to a stable intermediate pressure known as the final usage pressure in a buffer capacity known as the work capacity before being used in the engine cylinder(s). The well-known conventional pressure reducing valves using diaphragms and springs have very low flow rates and their use for this application requires very heavy poorly-performing devices; furthermore, they are very susceptible to freezing due to the humidity of the air chilled during the pressure drop.

To resolve this problem, the author has also registered a patent WO 03/089764 A1, to which reference should also be made, concerning a variable flow reducing valve and distribution system for compressed air injection engines, comprising a high-pressure compressed air tank and a work capacity.

The author has also registered a patent application WO 02/070876 A1 concerning an expansion chamber with a variable volume comprising two separate tanks one of which is in communication with the compressed air inlet and the other joined to the cylinder, which may be connected together or isolated from one another such that during the exhaust cycle, it is possible to charge the first of the tanks with compressed air then establish the pressure in the second at the end of the exhaust cycle while the piston is at TDC and before restarting its travel, the two tanks remaining in communication and releasing pressure together to carry out the engine stroke and that at least one of the tanks is provided with a means of changing their volume to enable the resultant torque of the engine to be varied at equal pressure.

The filling up of the chamber is always detrimental to the general efficiency in the operation of these “pressure reduction” engines.

BRIEF SUMMARY OF THE INVENTION

The engine in the invention uses a device for stopping the piston at top dead centre. It is powered, for preference, by compressed air or any other compressed gas contained in a high-pressure storage reservoir through a buffer tank called the buffer capacity. The buffer capacity in the bi-energy version comprises an air heating device powered by a supplementary energy (fossil or other energy) which increases the temperature and/or pressure of the air passing through it.

The engine according to the invention is characterized by the means implemented taken together or separately and in particular:

- In that the expansion chamber consists of a variable volume fitted with the means to produce work and that is joined to and in contact with the space contained above the main engine piston by means of a permanent passage.
- In that when the piston is stopped at top dead centre, the air or gas under pressure is admitted into the expansion chamber when this is at its smallest volume and, under its thrust, increases its volume by producing work,
- In that the expansion chamber being maintained at very nearly its maximum volume, the compressed air contained within then expands into the engine cylinder thus pushing the engine piston downwards along its travel by in turn supplying work,
- In that as the engine piston rises during the exhaust stroke, the variable volume in the expansion chamber is returned to its smallest volume to restart the complete work cycle.

The expansion chamber of the engine according to the invention actively participates in the work. The engine according to the invention is called an active chamber engine.

The engine according to the invention is favourably fitted with a variable flow pressure reducing valve according to WO 03/089764 A1 called a dynamic pressure reducing valve which feeds the work capacity at its usage pressure with the compressed air from the storage reservoir by carrying out an isothermal pressure reduction without work.

The thermodynamic cycle according to the invention is characterized by an isothermal expansion without work enabled by the dynamic pressure reducing valve followed by a transfer accompanied by a very slight quasi-isothermal expansion—for example a capacity of 3,000 cubic centimeters in a capacity of 3050 cubic centimeters—with work using the air pressure contained in the work capacity while the expansion chamber is filling, then a polytropic expansion from the expansion chamber into the engine cylinder with work and lowering of the temperature to finish by the exhaust of the expanded air into the atmosphere.

According to the invention, the thermodynamic cycle therefore comprises four phases in compressed air mono-energy mode:

An isothermal expansion without work,

A transfer—slight expansion with work known as quasi-isothermal,

A polytropic expansion with work,

An exhaust at ambient pressure.

It its bi-energy application according to the invention and in supplementary fuel mode, the compressed air contained in the work capacity is heated by supplementary energy in a thermal heater. The arrangement enables the quantity of usable and available energy to be increased due to the fact that before being introduced into the active chamber the compressed air rises in temperature and increases its pressure and/or volume enabling increases in performance and/or autonomy. The use of a thermal heater has the advantage of enabling clean continuous combustion to be used which can be catalyzed or depolluted by any existing means in order to obtain minimal polluting emissions.

A thermal heater can use fossil fuels such as petrol, diesel or vehicle LPG, bio fuels or alcohols—ethanol, methanol—thus achieving bi-energy operation with external combustion where a burner is used to increase the temperature.

According to a variant of the invention, the heater favourably uses thermochemical processes based on absorption and desorption processes such as those used and described, for example, in patents EP 0 307297 A1 and EP 0 382586 B1, these processes using the evaporation of a fluid, for example liquid ammonium, into gas reacting with salts such as calcium or manganese chlorides or others, the system operating like a thermal battery.

According to a variant of the invention, the active chamber engine is fitted with a thermal heater with a burner, or other, and a thermochemical heater of the type previously cited which would be able to be used jointly or successively during phase 1 of the thermochemical heater where the thermal heater using the burner is used to regenerate (phase 2) the thermochemical heater when the latter is empty by using the heater with the burner to heat its reactor during the continuation of operation of the unit.

Where a combustion heater is used, the active chamber engine according to the invention is an external combustion chamber engine called an external combustion engine. However, either the combustions of the said heater can be internal in applying the flame directly to the operating compressed air, the engine then being said to be “external-internal combustion”, or the combustions of the said heater are external by heating the operating air through a heat exchanger where the engine is said to be “external-external combustion”.

In operating mode with supplementary energy, the thermodynamic cycle comprises five phases:

An isothermal expansion,

An increase in temperature,

A transfer—slight expansion with work known as quasi-isothermal,

A polytropic expansion with work,

An exhaust at ambient pressure.

All mechanical, hydraulic, electrical or other devices used, as far as the engine cycle is concerned, to carry out the three phases of the work cycle of the active chamber, i.e.:

When the engine piston is stopped at top dead centre: admission of a charge into the active chamber producing work by increasing its volume, During the expansion travel of the engine piston: maintenance at a predetermined volume which is the actual volume of the expansion chamber, During the exhaust stroke of the engine piston: repositioning of the active chamber to its minimum volume to enable the cycle to be renewed, may be used without changing the principle of the invention described.

For preference, the variable volume expansion chamber known as the active chamber is made up of a piston known as the pressure piston sliding in a cylinder and linked by a connecting rod to the crank of the engine, a classic design which determines a two-phase sequence: downward travel and upward travel.

The engine piston is controlled by a device for stopping the piston at top dead centre which determines a three-phase sequence: upward travel, stop at top dead centre and downward travel.

To enable the engine to be set according to the invention, the travels of the pressure piston and the engine piston are different, that of the pressure piston being longer and predetermined such that when during the downward travel of the pressure piston, the volume chosen as being the “actual volume of the expansion chamber” is reached, the downward travel of the engine piston starts and that, during this downward travel, the pressure piston continues and terminates its own downward travel—thus producing work—then starts its upward travel while the engine piston with a shorter and quicker travel, catches it up in its upward travel so that both pistons reach their dead centres at roughly the same time. It should be noted that during the start of its upward travel, the pressure piston is subject to a negative work which, de facto, has been compensated by an additional positive work at the end of its downward travel.

During operation in compressed air mode, on a vehicle running in an urban location operating without pollution for example, only the pressure of the compressed air stored in the high pressure reservoir is used; in bi-energy operation in supplementary energy mode (fossil or other), on a vehicle running on the open road with minimal pollution for example, the heating of the work capacity is then required to increase the temperature of the air passing through it and consequently its usable volume and/or pressure thus giving better performance and/or autonomy.

According to the invention, the engine is controlled as regards torque and speed by controlling the pressure in the work capacity, this being favourably achieved using the dynamic pressure reducing valve. When it operates in bi-energy mode with supplementary energy (fossil or other) an electronic computer controls the quantity of supplementary energy provided according to the pressure in the said work capacity.

According to a variant of the invention, to enable autonomous operation of the engine during its use with supplementary energy and/or when the compressed air storage reservoir is empty, the active chamber engine according to the invention is connected to an air compressor to supply compressed air to the high pressure compressed air storage reservoir.

The bi-energy active chamber engine thus equipped operates normally in two modes by using, as an in-town vehicle for example, zero-pollution operation with the compressed air contained in the high pressure storage reservoir, and on the open road, still as an example, in supplementary energy mode with its thermal heater supplied by a fossil fuel or other energy source while using an air compressor to re-supply air to the high-pressure storage reservoir.

According to another variant of the invention, the air compressor feeds the work capacity directly. In this case, the engine is controlled by controlling the pressure of the compressor and the dynamic pressure reducing valve between the high pressure storage reservoir and the work capacity remains blocked off.

According to another variant of these arrangements, the air compressor feeds either the high pressure reservoir or the work capacity or both volumes in combination.

According to the invention, the bi-energy active chamber engine has de facto three main operating modes:

Mono-energy compressed air

Bi-energy compressed air plus supplementary energy

Mono-energy with supplementary fuel energy.

The active chamber engine may also be produced in mono-energy with fossil or other fuel when it is attached to an air compressor feeding the work capacity as described above, the high pressure compressed air storage reservoir then being simply removed.

In the case of operation in supplementary energy mode with use of external-external combustion, the exhaust from the active chamber engine can be recycled to the compressor inlet.

According to a variant of the invention, the engine is made up of multiple expansion stages, each stage comprising an active chamber according to the invention. A heat exchanger is positioned between each stage which heats the exhaust air from the previous stage for mono-energy operation using compressed air and/or a heating device using supplementary energy for bi-energy operation. The displacement of each following stage is larger than that of the preceding stage.

For a mono-energy compressed air engine, the expansion in the first cylinder having lowered the temperature, the heating of the air is done favourably using an air-air heat exchanger with ambient temperature.

For a bi-energy engine using supplementary energy, the air is heated using supplementary energy in a thermal heater, for example using fossil fuel.

According to a variant of this arrangement, after each stage, the exhaust air is directed towards a single heater with several stages in order to use only one combustion source.

The heat exchangers can be air-air exchangers or air-liquid or any other device or gas producing the desired effect.

The active chamber engine according to the invention can be used in all terrestrial, maritime, railway or aeronautical engines. The active chamber engine according to the invention can also and favourably find applications in emergency electrical generator sets and also in numerous domestic cogeneration applications producing electricity, heating and air conditioning.

BRIEF DESCRIPTION OF THE DRAWING FIGS.

Other aims, benefits and characteristics of the invention will be shown upon reading the descriptions of various possible, but non-limiting, configurations shown in the appended diagrams, where:

FIG. 1 gives a schematic representation of an active chamber engine seen in cross-section with its HP air supply device.

Figure 7:
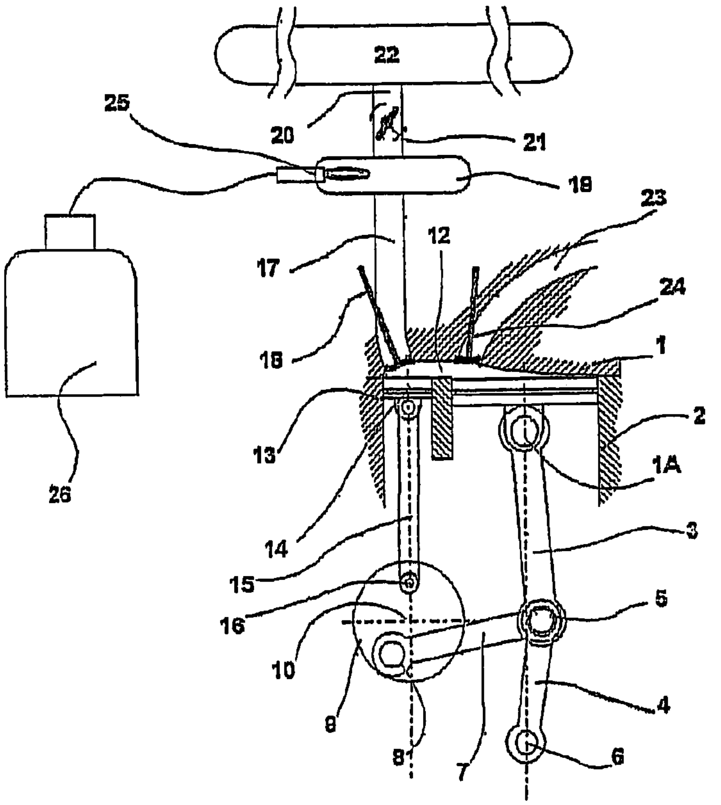

FIG. 7 gives a schematic representation of an active chamber engine seen in cross-section with its HP air supply device consisting of a device to heat the air by combustion.

Figure 8:
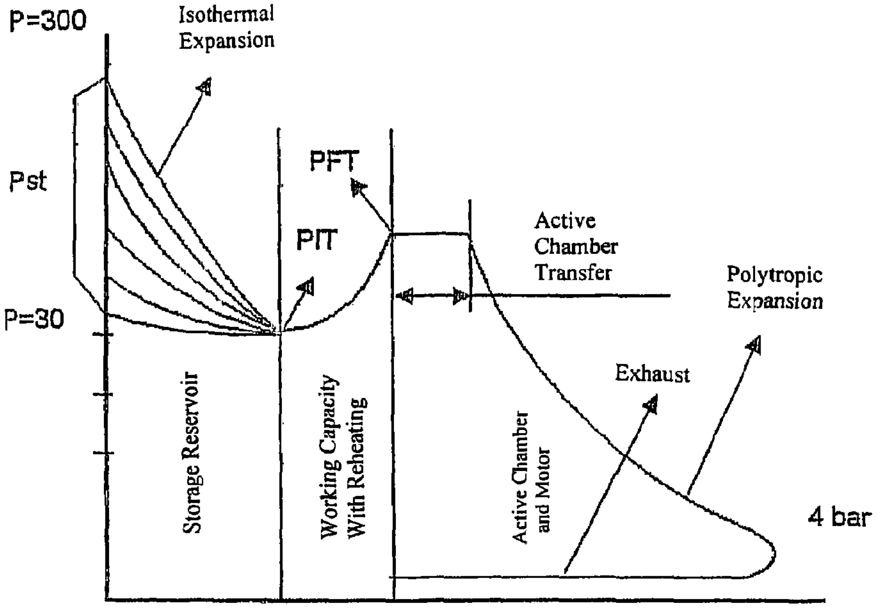

FIG. 8 represents a graph of the thermodynamic cycle in bi-energy mode using compressed air and supplementary energy.

Figure 9:
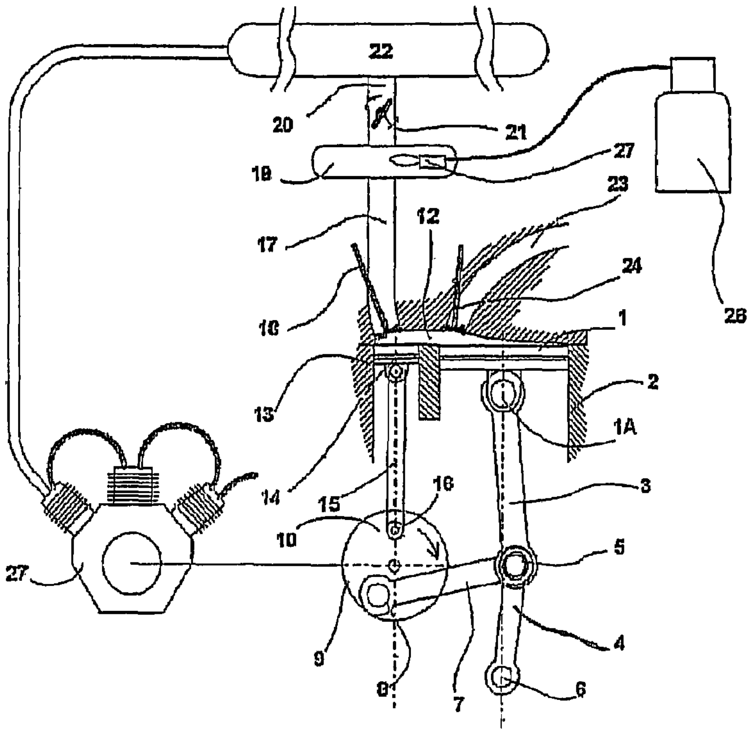

FIG. 9 represents a schematic view of an active chamber engine according to the invention connected to an air compressor for autonomous operation.

Figure 10:
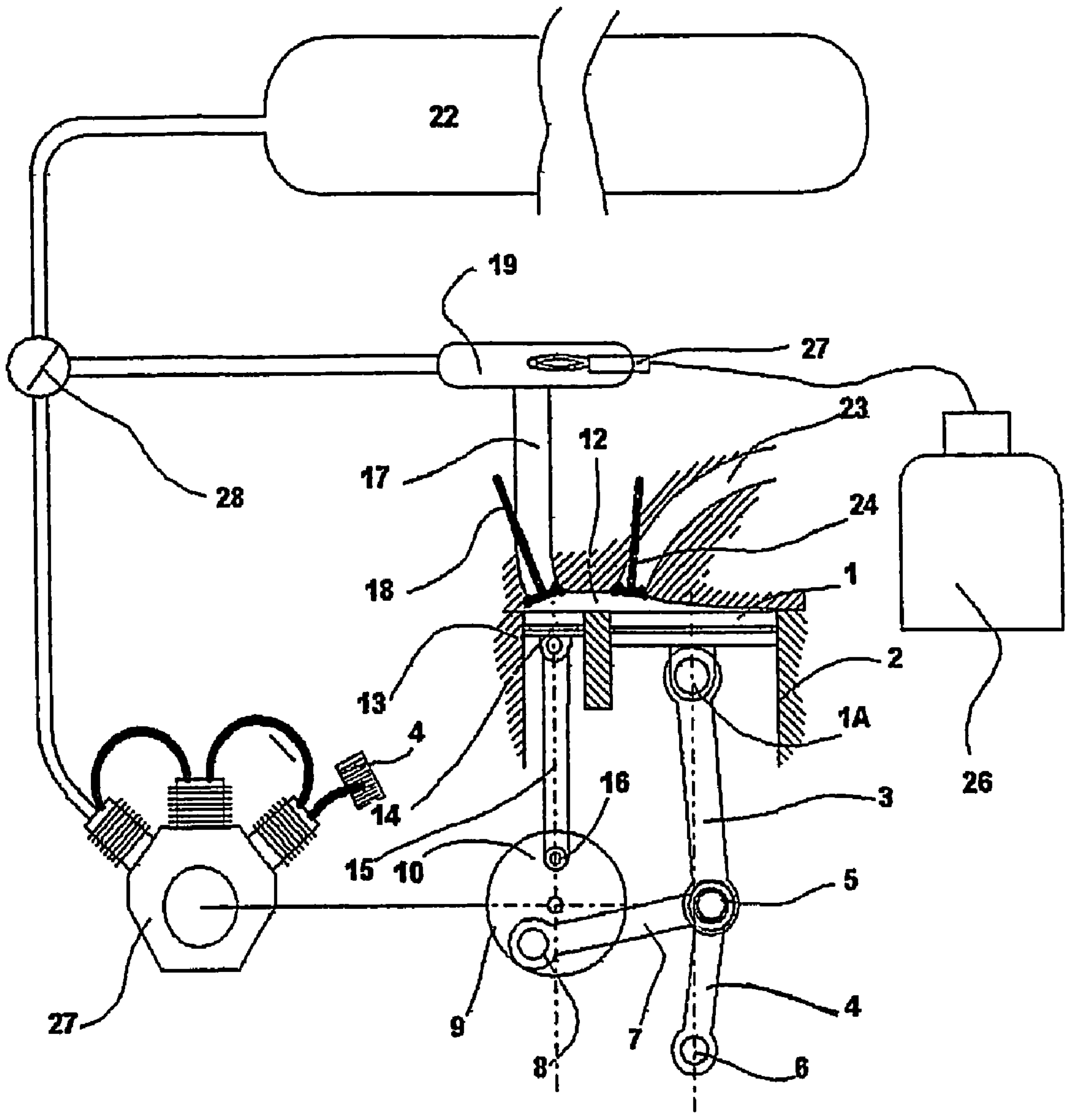

FIG. 10 gives a schematic representation of an active chamber engine according to the invention connected to an air compressor feeding the storage reservoir and the work capacity.

Figure 11:
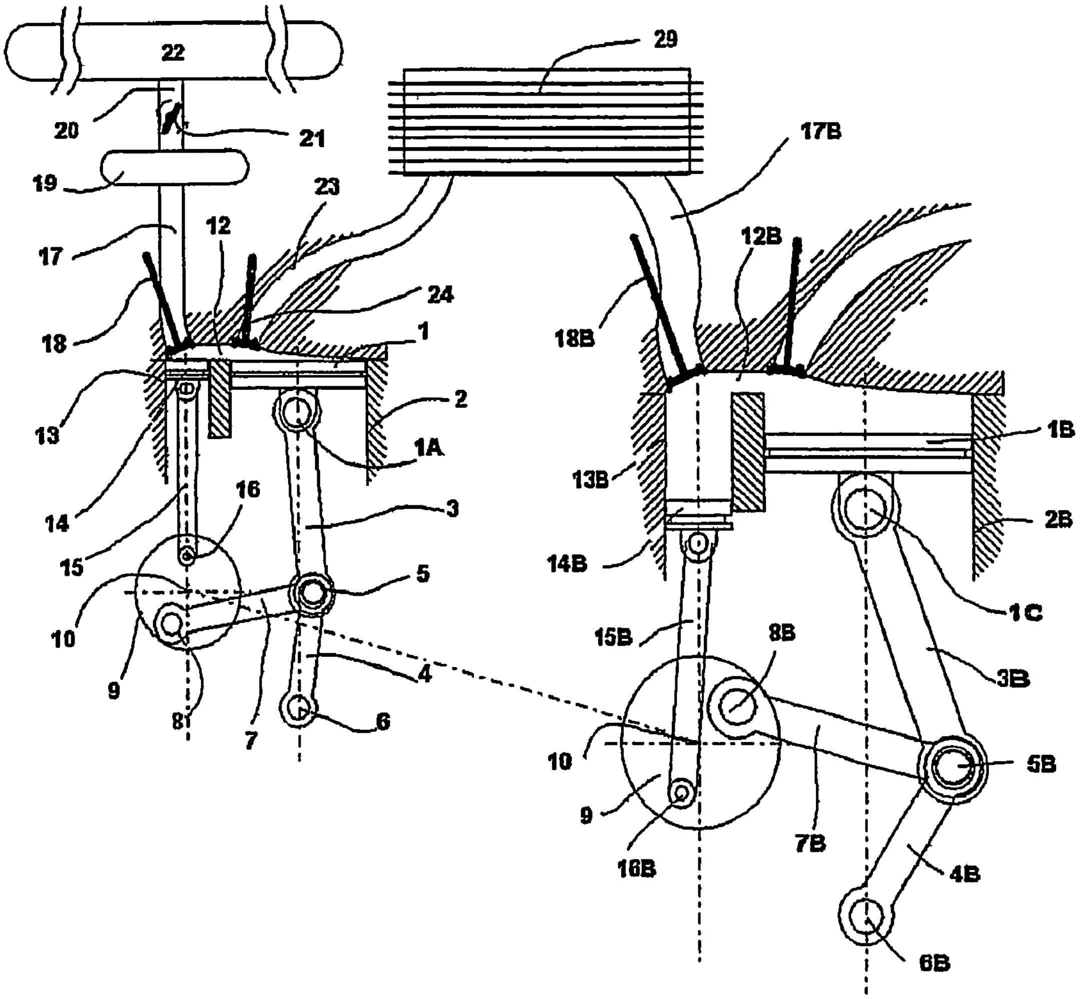

FIG. 11 gives a schematic representation of an active chamber engine according to the invention comprising two expansion stages.

Figure 12:
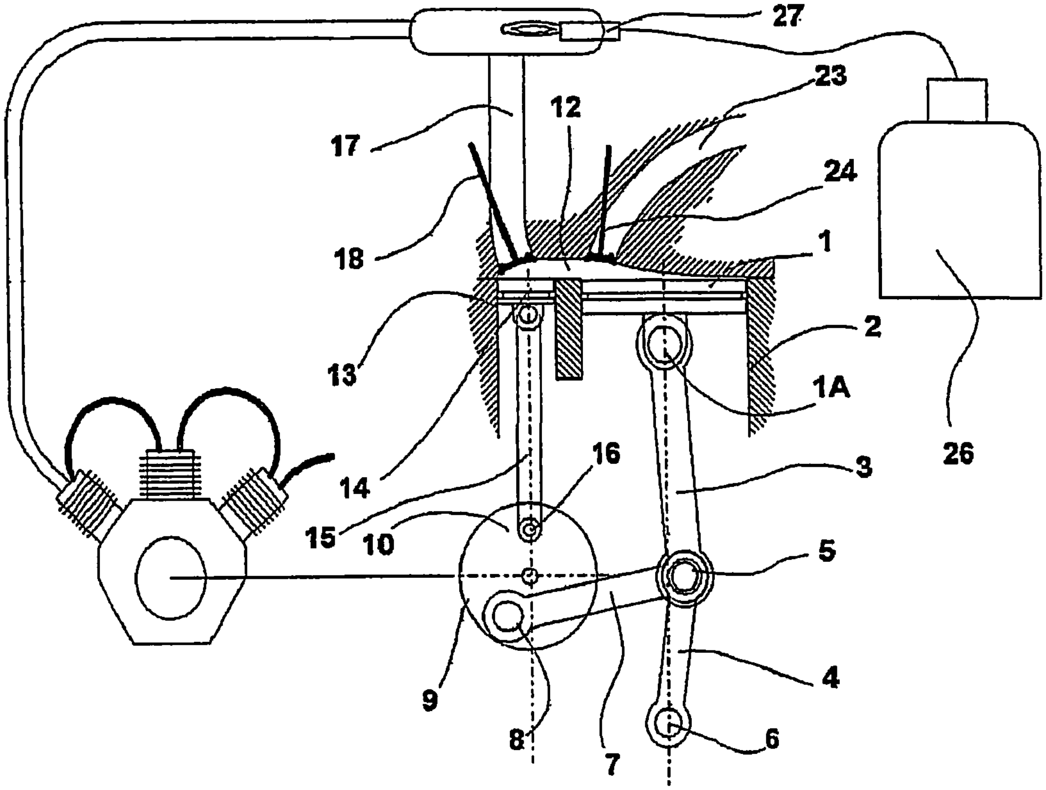

FIG. 12 gives a schematic representation of an active chamber engine according to the invention in mono-energy mode with fossil fuel.

DETAILED DESCRIPTION OF THE PREFERRED EMBODIMENTS

Figure 1:
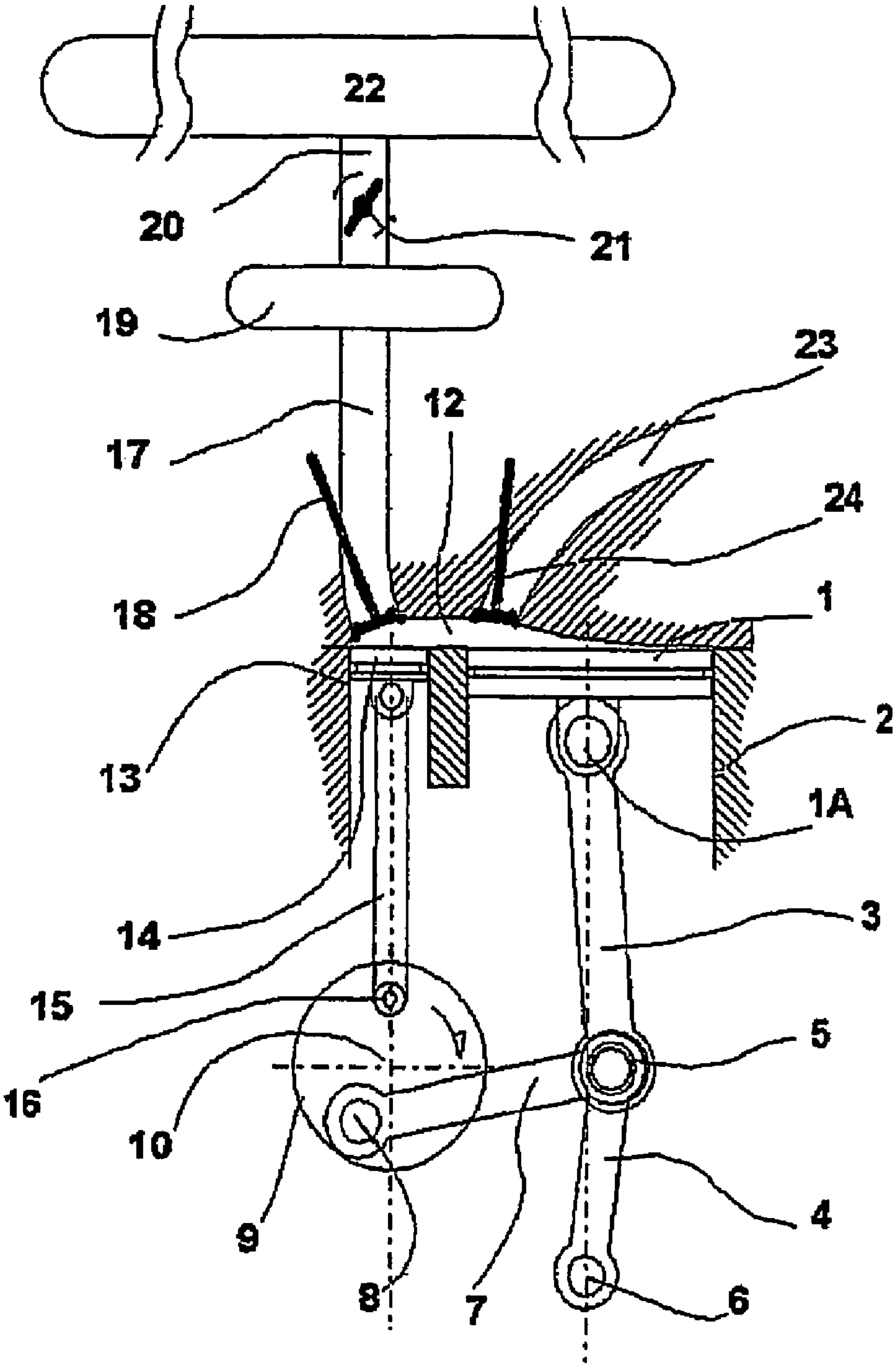

FIG. 1 represents an active chamber engine according to the invention which shows the engine cylinder in which piston 1 slides (represented at its top dead centre), sliding in cylinder 2 which is controlled by a pressure lever. Piston 1 is connected by its pin to the free end 1A of a pressure lever made up of arm 3 articulated on pin 5 common to another arm 4 fixed oscillating on immobile pin 6. On pin 5 common to arms 3 and 4 a control connecting rod 7 is connected to crankpin 8 of crank 9 turning on its axis 10. When the crank rotates, the control connecting rod 7 exercises a force on common pin 5 of arms 3 and 4 of the pressure lever thus moving piston 1 along the axis of cylinder 2 and transmits in return the forces exercised on piston 1 during the engine stroke to crank 9 thus causing it to rotate. The engine cylinder is connected via passage 12 in its upper part with active chamber cylinder 13 in which piston 14 (known as the pressure piston) slides connected by connecting rod 15 to crankpin 16 of crank 9. Inlet duct 17 controlled by valve 18 unblocks passage 12 linking engine cylinder 2 and active chamber cylinder 13 and feeds the engine with compressed air from work capacity 19 maintained at the working pressure and itself fed with compressed air through duct 20 controlled by dynamic pressure reducing valve 21 from high pressure storage reservoir 22. Exhaust duct 23 controlled by exhaust valve 24 is provided in the upper part of cylinder 1.

A device controlled by the accelerator pedal controls dynamic pressure reducing valve 21 to regulate the pressure in the work chamber and thus control the engine.

Figure 2:
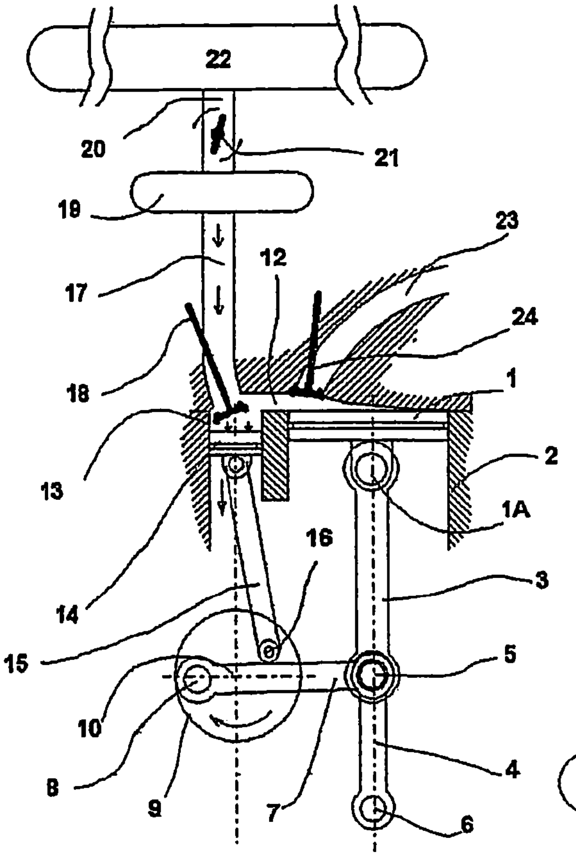
FIGS. 2 to 4 are schematic representations in cross section of the different operating phases of the engine according to the invention.
Figure 3:
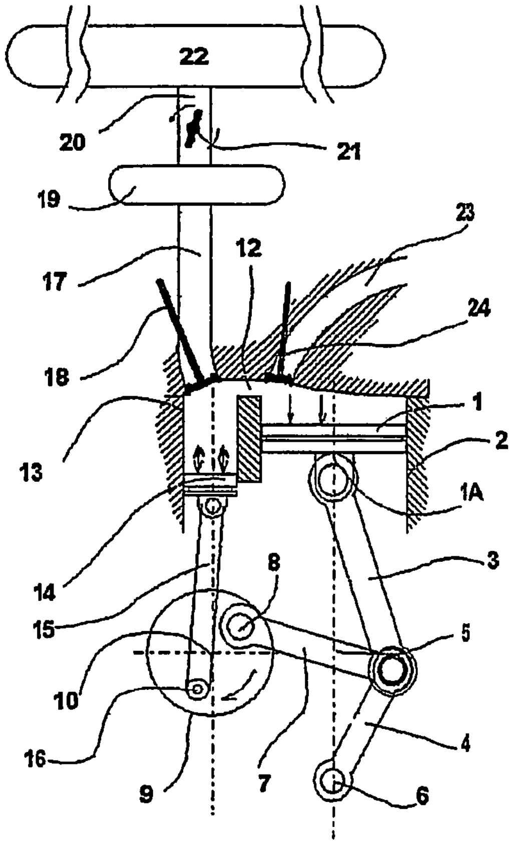
Figure 4:
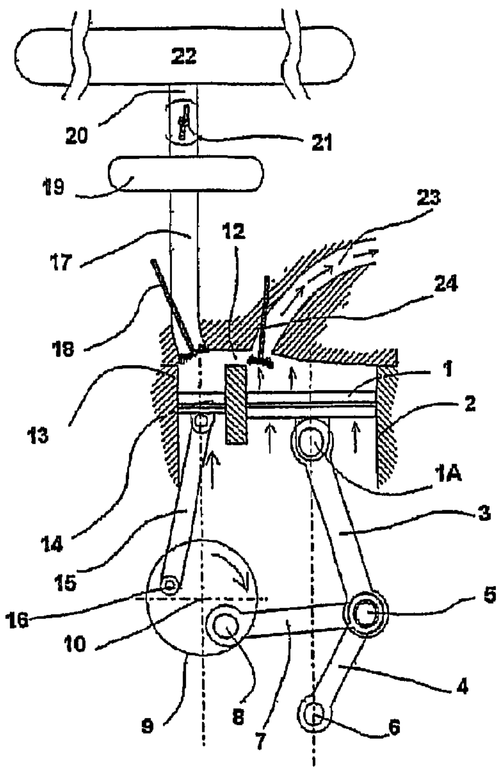

FIG. 2 gives a schematic representation, seen in cross-section, of the active chamber engine according to the invention during the inlet phase. Engine piston 1 is stopped at its top dead centre and inlet valve 18 has just been opened, the air pressure contained in work capacity 19 repels pressure piston 14 while filling the cylinder of active chamber 13 and producing work by rotating crank 9 via connecting rod 15, the work being considerable as produced at quasi-constant pressure. Upon continuing its rotation, the crank causes (FIG. 3) engine piston 1 to be displaced towards its bottom dead centre and almost simultaneously, inlet valve 18 is closed again. The pressure contained in the active chamber expands pushing engine piston 1 which produces work, in turn, by causing the rotation of crank 9 through its driveline assembly made up of arms 3 and 4 and control connecting rod 7. During this cycle of engine piston 1, the pressure piston continues its travel to the bottom dead centre then starts back up towards its top dead centre, all the components being adjusted such that during their upward travel (FIG. 4), the pistons arrive almost simultaneously at their top dead centre when the engine piston is stopped and the pressure piston restarts its cycle. During the upwards travel of the two pistons, exhaust valve 24 is open in order to remove expanded compressed air through exhaust duct 23.

Figure 5:
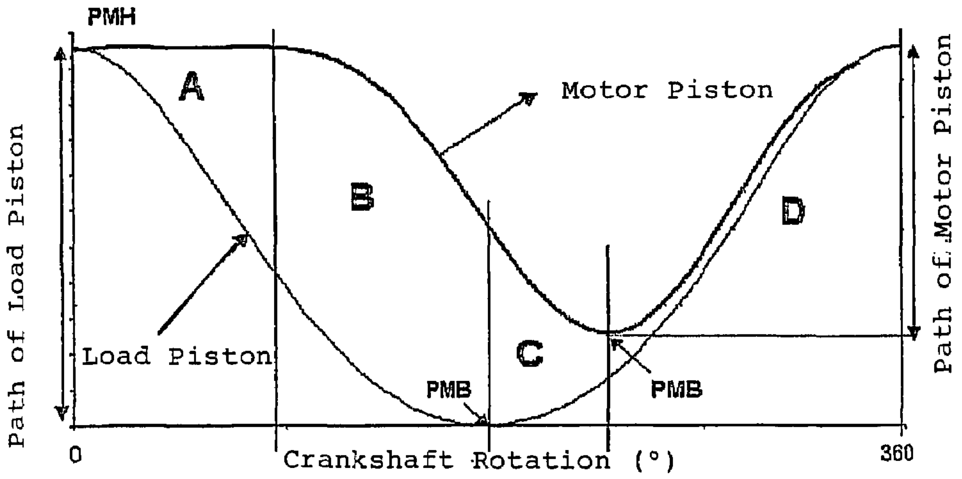
FIG. 5 represents a comparative curve of the travel sequence of the pressure piston and the engine piston.

FIG. 5 shows the slope of the comparative curves of the piston travels where the rotation of the crank is shown on the x-axis and the displacements of the pressure and engine pistons are shown on the y-axis from their top dead centres to their bottom dead centres and back again where, according to the invention, the travel of the pressure piston is greater than that of the engine piston. The graph is divided into 4 main phases. During phase A, the engine piston is maintained at its top dead centre and the pressure piston carries out the main part of its downward travel producing work, then in phase B, the engine piston carries out its downward expansion travel producing work while the pressure piston finishes its downward travel also producing work. When the pressure piston reaches its bottom dead centre, phase C, the engine piston continues its downward travel and the pressure piston starts its upward travel. It should be noted that during this phase the pressure piston is subject to a negative work which, de facto, is compensated by an additional positive work during phase B. In phase D the two pistons reach their top dead centres almost simultaneously to restart a new cycle. During phases A, B and C, the engine produces work.

Figure 6:
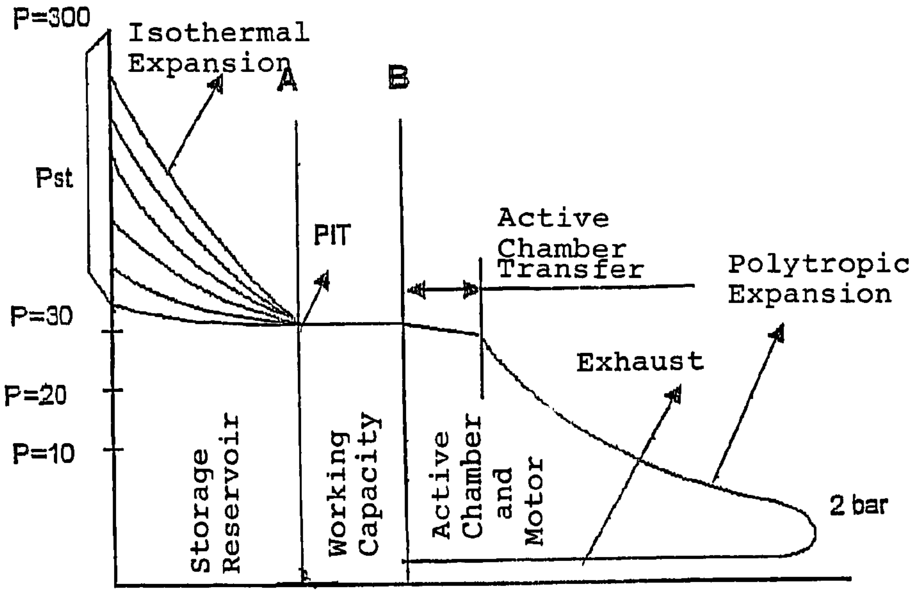
FIG. 6 represents a graph of the thermodynamic cycle in mono-energy mode using compressed air.

FIG. 6 represents the graph of the thermodynamic cycle in compressed air mono-energy mode where the various phases of the cycle in the various capacities which make up the active chamber engine according to the invention are shown on the x-axis and the pressures are shown on the y-axis. In the first capacity which is the storage reservoir is shown a network of isothermal curves going from storage pressure Pst to initial working pressure PIT, the storage pressure reducing as the reservoir is emptied while the pressure PIT will be controlled according to the desired torque between a minimum operating pressure and a maximum operating pressure, here, for example, between 10 bar and 30 bar. In the work capacity, during the charging of the active chamber, the pressure remains almost identical. When the inlet valve is opened, the compressed air contained in the work capacity is transferred to the active chamber producing work accompanied by a slight reduction in pressure, for example, for a work capacity of 3000 $cm^3$ and an active chamber of 35 $cm^3$, the pressure drop is 1.16% i.e., and still as an example, an actual working pressure of 29.65 bar for an initial working pressure of 30 bar. Then the engine piston starts its downward travel with a polytropic expansion which produces work with a lowering of the pressure until the exhaust valve is opened (for example at about 2 bar) followed by a return to atmospheric pressure for restarting a new cycle.

FIG. 7 represents the engine and its assembly in a bi-energy version with supplementary energy which shows in work capacity 19 a schematic device for heating the compressed air using supplementary energy, here a burner 25 fed by gas cylinder 26. The combustion represented in this figure is therefore external-internal combustion and enables the volume and/or pressure of the compressed air from the storage reservoir to be increased considerably.

FIG. 8 represents the graph of the thermodynamic cycle in compressed air and supplementary energy bi-energy mode where the various phases of the cycle in the various capacities which make up the active chamber engine according to the invention are shown on the x-axis and the pressures are shown on the y-axis. In the first capacity which is the storage reservoir is shown a network of isothermal curves going from storage pressure Pst to initial working pressure PIT, the storage pressure reducing as the reservoir is emptied while the pressure PIT will be controlled according to the desired torque between a minimum operating pressure and a maximum operating pressure, here, for example, between 10 bar and 30 bar. In the work capacity, heating the compressed air considerably increases the pressure from the initial pressure PIT to the final working pressure PFT: for example for a PIT of 30 bar, an increase in temperature of the order of 300 degrees gives a PFT of the order of 60 bar. When the inlet valve is opened, the compressed air contained in the work capacity is transferred to the active chamber producing work and accompanied by a slight reduction in pressure: for example for a work capacity of 3000 $cm^3$ and an active chamber of 35 $cm^3$, the pressure drop is 1.16% i.e., and still as an example, an actual working pressure of 59.30 bars for an initial working pressure of 60 bars. The engine piston then starts its downward travel with a polytropic expansion which produces work with a lowering of the pressure until the exhaust valve is opened (for example at about 4 bars) followed by a return to atmospheric pressure during the exhaust stroke for starting a new cycle.

The active chamber engine also works autonomously in bi-energy mode with supplementary energy provided by fossil fuels or other fuels (FIG. 9) where, according to a variant of the invention, it drives air compressor 27 which supplies storage reservoir 22. The general operation of the machine is the same as described previously in FIGS. 1-4. This arrangement enables the storage reservoir to be filled during operation with additional energy but causes a relatively large energy loss due to the compressor. According to another variant of the invention (not shown on the drawings), the air compressor supplies the work capacity directly. In this operating arrangement, dynamic pressure reducing valve 21 is kept closed and the compressor supplies compressed air to the work capacity, the compressed air being heated by a heating device and is increased in pressure and/or volume for supplying active chamber 13 as described in the previous scenarios. The engine is controlled in this operating scenario by directly regulating the pressure by the compressor and the energy loss due to the compressor is much less than the previous scenario. Finally, and according to another variant of the invention (FIG. 10), the compressor supplies high pressure storage reservoir 22 and work capacity 19 simultaneously or successively depending on the energy requirements. Bidirectional valve 28 is used to direct the supply to either storage reservoir 22 or work capacity 19, or both simultaneously. The choice is made according to the energy requirements of the engine with regard to the energy requirements of the compressor: if the demand on the engine is relatively low, the high pressure reservoir is supplied. If the energy requirements on the engine are high, only the work capacity is supplied.

FIG. 11 gives a schematic representation of an active chamber engine according to the invention comprising two expansion stages showing high pressure compressed air storage reservoir 22, dynamic pressure reducing valve 21, work capacity 19 together with the first stage comprising engine cylinder 2 in which piston 1 slides (represented at its top dead centre), which is controlled by a pressure lever. Piston 1 is connected by its pin to the free end 1A of a pressure lever made up of arm 3 articulated on pin 5 common to another arm 4 fixed oscillating on immobile pin 6. On common pin 5 a control connecting rod 7 is connected to arms 3 and 4 which is connected to crankpin 8 of crank 9 turning on its pin 10. When the crank rotates, the control connecting rod 7 exercises a force on common pin 5 of arms 3 and 4 of the pressure lever thus moving piston 1 along the axis of cylinder 2 and transmits in return the forces exercised on piston 1 during the engine stroke to crank 9 thus causing it to rotate. The engine cylinder is connected via passage 12 in its upper part with active chamber cylinder 13 in which piston 14 (known as the pressure piston) slides connected by connecting rod 15 to crankpin 16 of crank 9. Inlet duct 17 controlled by valve 18 unblocks passage 12 linking engine cylinder 2 and active chamber cylinder 13 and feeds the engine with compressed air from work capacity 19 maintained at the working pressure and itself fed with compressed air through duct 20 controlled by dynamic pressure reducing valve 21. Exhaust duct 23 is connected through heat exchanger 29 to inlet 17B of the second stage of the engine comprising engine cylinder 2B in which piston 1B slides which is controlled by a pressure lever. Piston 1B is connected by its pin to the free end 1C of a pressure lever made up of arm 3B articulated on pin 5B common to another arm 4B fixed oscillating on immobile pin 6B. On pin 5B common to arms 3B and 4B, a control connecting rod 7B is connected to crankpin 8B of crank 9 turning on its axis 10. When the crank rotates, the control connecting rod 7B exercises a force on common pin 5B of arms 3B and 4B of the pressure lever thus moving piston 1B along the axis of cylinder 2B and transmits in return the forces exercised on piston 1B during the engine stroke to crank 9 thus causing it to rotate. The engine cylinder is connected via passage 12B in its upper part with active chamber cylinder 13B in which piston 14B (known as the pressure piston) slides connected by connecting rod 15B to crankpin 16B of crank 9. Inlet duct 17B controlled by valve 18B unblocks passage 12B linking engine cylinder 2B and active chamber cylinder 13B and feeds the engine with compressed air. In order to simplify the drawing, the second stage is shown alongside the first stage. It goes without saying that it is preferable to use only one crank and that the second stage is on the same longitudinal plane as the first stage. Exhaust duct 23 of the first engine stage is connected through air-air heat exchanger 29 to admission duct 17B of the second engine stage. In this type of configuration, the first stage will be sized such that at the end of the engine expansion, the exhaust air has a residual pressure which, after heating in the air-air heat exchanger to increase its pressure and/or volume, will provide sufficient energy to operate the following stage correctly.

FIG. 12 shows a mono-energy active chamber engine operating with fossil fuel. The engine is coupled to compressor 27 which supplies compressed air to work capacity 19 which here includes burner 25 supplied with energy from gas cylinder 26. The general operation of the machine is the same as described previously.

The operation of the active chamber engine is described assuming the use of compressed air. However, any compressed gas could be used without changing the invention described.

The invention is not limited to the examples of configurations described and represented: the materials, control means and devices described may vary, while remaining equivalent, to produce the same results. The number of engine cylinders, their arrangement, volume and number of expansion stages may vary without changing in any way the invention described.

The invention claimed is:

1. An active chamber engine, comprising:

at least one piston (1) sliding in a cylinder (2) controlled by a device for stopping the piston at top dead centre and supplied with compressed air or any other gas at high pressure contained in a storage reservoir (22) which is reduced to an average pressure called a working pressure in a work capacity (19), wherein:

an expansion chamber of has a variable volume fitted with means to produce work and is joined to and in contact with a space contained above a main engine piston by means of a permanent passage(12), when the piston is stopped at top dead centre, the air or gas under pressure is admitted into the expansion chamber when the expansion chamber is at its smallest volume and, under the thrust of this air under pressure, the expansion chamber increases its volume by producing work, when the expansion chamber being maintained at very nearly its maximum volume, the compressed air contained within the expansion chamber then expands into the engine cylinder thus pushing the engine piston downwards along its travel by in turn supplying work, during an upwards travel of the engine piston during an exhaust stroke, the variable volume in the expansion chamber is returned to its smallest volume to restart a complete work cycle.

2. The active chamber engine according to claim 1, wherein the work cycle of the active chamber with regard to a cycle of the engine piston comprises three phases such that:

when the engine piston is stopped at top dead centre: admission of a charge into the active chamber producing work by increasing its volume, during expansion travel of the engine piston: maintenance at a predetermined volume which is the actual volume of the expansion chamber, during the exhaust stroke of the engine piston: repositioning of the active chamber to its minimum volume to enable the cycle to be renewed.

3. The active chamber engine according to claim 2, wherein an operating thermodynamic cycle in compressed air mono-energy mode has an isothermal expansion without work with conservation of energy, carried out between the high pressure compressed air storage reservoir and the work capacity, followed by a transfer accompanied by a very slight expansion in the pressure cylinder known as quasi-isothermal with work, then a polytropic expansion with work in the engine cylinder and lastly an exhaust at atmospheric pressure has four phases as follows:

an isothermal expansion without work, a transfer—slight expansion with work known as quasi-isothermal, a polytropic expansion with work, an exhaust at ambient pressure.

4. The active e chamber engine according to claim 1, wherein the work capacity (19) comprises a device (25,26) for heating the compressed air with a supplementary energy provided by fossil or other fuel, said device (25,26) increasing the temperature and/or pressure of the air passing through said device (25,26).

5. The active chamber engine according to claim 4, wherein the compressed air is heated by the combustion of fossil or biological fuel directly in the compressed air, the engine then being an external internal combustion engine.

6. The active chamber engine according to claim 4, wherein the compressed air contained in the work capacity is heated by the combustion of fossil or biological fuel in a heat exchanger, the flame not coming into direct contact with the compressed air, the engine then being an external-external combustion engine.

7. The active chamber engine according to claim 4, wherein the thermal heater uses a thermochemical gas solid reaction process based on transformation by evaporation of a reagent fluid contained in an evaporator, or transformation with liquid ammonia or a gas which reacts with a solid reagent contained in a reactor, or transformation of liquid ammonia with salts of calcium, magnesium or barium chlorides or with salts whose chemical reaction produces heat and which, when the reaction has finished can be regenerated by heating the reactor which causes desorption of the gaseous ammonia which recondenses in the evaporator.

8. The active chamber engine according to claim 4, wherein the chamber's thermodynamic cycle when working in bi-energy mode with supplementary energy has an isothermal expansion without work with conservation of energy carried out in the work capacity by an increase in temperature by the heating of the air by fossil energy followed by a very slight expansion known as quasi-isothermal with work, a polytropic expansion with work in the engine cylinder and lastly an exhaust at atmospheric pressure representing 5 successive phases as follows:

an isothermal expansion, an increase in temperature, a transfer—slight expansion with work known as quasi-isothermal, a polytropic expansion with work, an exhaust at ambient pressure.

9. The active chamber engine according to claim 1, wherein a torque and a speed of the engine are controlled by controlling the pressure in the work capacity (19).

10. The active chamber engine according to claim 1, wherein during operation in bi-energy mode with supplementary energy, an electronic computer controls a quantity of energy used according to the pressure of the compressed air therefore a mass of the air introduced into the said work capacity.

11. The active chamber engine according to claim 1, wherein a volume of the active chamber is made up of a piston (14) called the pressure piston sliding in a cylinder (13) and connected by a connecting rod (15) to a crank of the engine (9) according to a classic drive sequence.

12. The active chamber engine according to claim 11, wherein a travel of the pressure piston (14) is determined such that when the volume chosen as volume of the chamber has been reached and during the downward travel of the engine piston (1), the pressure piston (14) finishes its downward travel and starts its upward travel so as to reach its top dead centre approximately at a same time as the engine piston reaches its top dead centre.

13. The active chamber engine according to claim 1, wherein to enable autonomous operation of the engine during its utilization with supplementary energy and/or when the compressed air storage reservoir (22) is empty, the active chamber engine is connected to an air compressor (27) to supply compressed air to the high pressure compressed air storage reservoir (22).

14. The active chamber engine according to claim 13, wherein the air compressor (27) directly supplies the work capacity (19), and the engine is controlled by controlling the pressure of the compressor (27) and a dynamic pressure reducing valve (21) between the high pressure storage reservoir and the work capacity remains blocked off.

15. The active chamber engine according to claim 14, wherein the coupled air compressor (27) supplies compressed air simultaneously or successively in combination the storage reservoir (22) and the work capacity (19).

16. The active chamber engine according to claim 1, wherein a mono-energy operation with a fossil or other fuel, the work capacity (19) being supplied only by a coupled air compressor (27), the high pressure compressed air storage reservoir is omitted.

17. The active chamber engine according to claim 6, wherein an exhaust after expansion is recalculated to an inlet of a coupled air compressor (27).

18. The active chamber engine according to claim 1 working in compressed air mono-energy mode, wherein the engine is comprised of multiple expansion stages of increasing cylinder sizes each stage comprising an active chamber and in that, between each stage a heat exchanger (29) is positioned to heat exhaust air from the previous stage.

19. The active chamber engine according to claim 18 operating in bi-energy mode, wherein the heat exchanger positioned between each stage is fitted with a heating device running on supplementary energy.

20. The active chamber engine according to claim 19, wherein the heat exchangers and the heating device are combined together or separately in a multiple stage device using the same energy source.

21. The active chamber engine according to claim 1, wherein the air or any other gas at high pressure contained in the storage reservoir (22) is reduced to the average pressure through a dynamic pressure reducing valve (21).

* * * * *